Nov. 26, 1957 W. CULSHAW 2,814,724

PHASE CHANGING DEVICES FOR ELECTRO-MAGNETIC WAVES

Filed Jan. 25, 1954 3 Sheets-Sheet 1

*Inventor*
*WILLIAM CULSHAW*
*By* Harry M. Saragovitz
*Attorney*

Inventor
WILLIAM CULSHAW
By
Harry M. Saragovitz
Attorney

PHASE CHANGING DEVICES FOR ELECTRO-MAGNETIC WAVES

Filed Jan. 25, 1954 3 Sheets-Sheet 3

*Inventor*
WILLIAM CULSHAW
By Harry M. Saragovitz
*Attorney*

United States Patent Office 2,814,724

Patented Nov. 26, 1957

2,814,724

PHASE CHANGING DEVICES FOR ELECTROMAGNETIC WAVES

William Culshaw, Malvern, England, assignor to Minister of Supply in Her Majesty's Government of the United Kingdom of Great Britain and Northern Ireland, London, England Application January 25, 1954, Serial No. 406,028

Claims priority, application Great Britain January 26, 1953

11 Claims. (Cl. 250—13)

The present invention relates to apparatus for changing or controlling the phase of electromagnetic waves and is of application to very short radio waves in the millimetre wavelength region. The invention concerns apparatus for controlling the polarisation characteristics of radio waves, for example by converting plane polarised radiations into circularly polarised and vice versa. The invention also is concerned with the application of such apparatus for the achievement of so-called "common T and R" aerial arrangements, rotating joints and so on for handling radio waves, at the very short wavelengths now becoming practicable.

The invention is predicated on a newly discovered effect in which the proximity of a conductive surface to the face of a dielectric mass at which radiations are being totally reflected internally, operates upon the phase of the reflected radiations; the extent to which the phase is affected is in a sense, determined by the distance of the conductive surface from the dielectric face, the dielectric constant of the dielectric mass, the angle of incidence of the radiations and so on.

It is well known in the phenomenon of total reflection that although the intensity of energy flow in the reflected wave is equal to the intensity in the incident wave, the instantaneous field in the less dense medium is by no means zero. The time average of this field is zero, however, there being no average flow of energy into the less dense medium but only an oscillation of energy to and fro across the totally reflecting boundary. The field existing in the less dense medium is due to an inhomogeneous plane wave in which the surfaces of constant phase do not coincide with the surfaces of constant amplitude. These latter are planes parallel to the totally reflecting boundary whilst the constant phase surfaces are planes perpendicular to this boundary and to the surfaces of constant amplitude. The amplitude of this wave is rapidly attenuated exponentially with distance from the totally reflecting boundary, i. e. the wave is reactive or evanescent.

Since this evanescent wave is effective only at distances up to about a wavelength from the boundary, its presence is more readily detected at microwavelengths, where accurate control of frequency, intensity and polarisation are also available, rather than at optical wavelengths. Thus its presence is readily detected using microwaves by the gradual separation of two totally reflecting prisms when the received energy through the second prism falls off exponentially with distance apart of the prisms.

During the investigation of total reflection phenomenon using a microwave analogue of the optical spectrometer and a totally reflecting 45° Perspex prism, the idea arose of trying the effect of a "perfect" reflector or metal plate in the effective region of this evanescent wave, i. e. reasonably close and parallel to the totally reflecting surface of the prism. Such a plate may be expected to modify the boundary conditions at the totally reflecting surface, such that the phase difference, which occurs on total reflection between waves polarised with the electric vector in and perpendicular to the plane of incidence, is changed without affecting their amplitudes. Such a change would then appear as a variation in the resultant polarisation of the reflected waves.

The theoretical treatment of the problem will now be discussed, followed by experimental results and some examples of practical applications of the effect, reference being made to the accompanying drawings in which.

Assume now a dielectric prism set up with a transmitting horn injecting radiations at a suitable wavelength into the prism, the radiation being totally reflected internally at one face of the prism and the reflected waves being picked up by a receiving horn. A metal plate is then placed parallel to the totally reflecting face of the prism and the resulting field examined. Any convenient means may be adopted to provide adjustment of the distance between the metal plate and the prism surface. To obtain the essential features of the effect of the metal plate the following approximations are made:

(i) Assume that the transmitting horn provides a plane wave, the diffraction effects of the aperture are then neglected.

(ii) Assume that the transmitting and receiving horns are within the prism. This assumption means that the effects of reflection at the two faces of the prism which are not parallel to the plate, and the diffraction effects of the edges of the prism are neglected.

(iii) Assume that the metal plate is perfectly conducting.

(iv) Assume that the prism has no conductivity and that its permeability is the same as that of free space.

It would be possible to formulate a more refined theory which removed some of the above assumptions but agreement between experiment and the following theory is sufficiently good to justify the assumptions.

Figure 1:
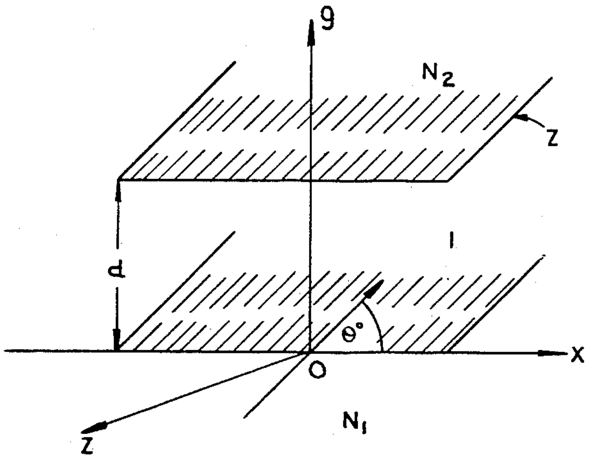
Fig. 1 is an explanatory diagram used in the theoretical discussion.

Using M. K. S. units and considering only periodic phenomena varying as the time factor $exp(i\omega t)$, this factor being suppressed in the analysis, then the refractive index N of a non-conducting medium is given by $N^2=\mu\epsilon$ where $\mu=\epsilon=1$ in free space. Thus the problem is that of a plane wave travelling in a medium refractive index $N(>1)$ which is $\sqrt{\epsilon}$ on account of assumption (iv), and incident on a plane interface (1 in Fig. 1) separating the medium from free space. Parallel to this interface and at a distance $d$ from it is a perfectly conducting plane (Z in Fig. 1). Let the first medium occupy $y\leq0$ whereas $0\leq y\leq d$ is free space. The incident wave produces, in $y\leq0$, a reflected wave which travels away from $y=0$. On $0\leq y\leq d$ there are two waves one travelling away from $y=0$ and one traveling towards $y=0$, the second being caused by reflection at $y=d$. These waves may be determined from the boundary conditions which are that the tangential components of the electric and magnetic intensities are continuous across the planes $y=0$, and $y=d$. The lines may be chosen so that the direction of propagation lines in $Z=0$ and makes an angle $\theta(0\leq\theta\leq\frac{1}{2}\pi)$ with the X axis. If the incident wave is polarised so that the electric intensity $e_0\ exp\ \{-ik(x\cos\theta+y\sin\theta)\}$ is perpendicular to the plane of incidence the electric intensity of the reflected wave in $y\leq 0$, $e_1\ \{-ik(x\cos\theta-y\sin\theta)\}$ is given by $$\frac{e_1}{e_0}=-\frac{(1+\psi)\sin\theta_2-(1-\psi)N\sin\theta}{(1+\psi)\sin\theta_2+(1+\psi)N\sin\theta} \quad (1)$$

where $\cos\theta_2=N\cos\theta$, $\psi=exp(-2ikd\sin\theta_2)$, and $k=2\pi/\lambda$, $\lambda$ being the free space wavelength.

If the incident wave is polarised so that the magnetic intensity is perpendicular to the plane of incidence, the magnetic intensity of the reflected wave in $y\leq 0$, $h_1\ exp\ \{-ik\ (x\cos\theta-y\sin\theta)\}$ is given by $$\frac{h_1}{h_0}=-\frac{(1-\psi)N\sin\theta_2-(1+\psi)\sin\theta}{(1-\psi)N\sin\theta_2+(1+\psi)\sin\theta} \quad (2)$$

where $h_0\ exp\{-ik\ (x\cos\theta+y\sin\theta)\}$ is the magnetic intensity of the incident wave. In the absence of the metal plate $e_1$ and $h_1$ are given by (1) and (2) with $\psi=0$.

In the experiment the apparatus is first set up so that total reflection takes place in the absence of the metal plate. This occurs when $$N\cos\theta\geq 1 \quad (3)$$

In order that the transmitted wave shall be exponentially damped we must arrange that $$\sin\theta_2=i\sqrt{(N^2\cos^2\theta-1)} \quad (4)$$

where the positive sign of the square root is taken. Equations 3 and 4 are not affected by the addition of the metal plate.

Suppose now the metal plate is present and that the incident wave is polarised at an angle of 45° to the normal to the plane of incidence. Let $e'_0$, $e''_0$ refer to the electric intensities of the incident waves with the electric vector normal and parallel respectively to the plane of incidence. Let $e'_0\ exp\ (i\delta')$, $e''_0\ exp\ (i\delta'')$ be the electric intensities of the reflected waves. Then, from Equations 1, 2 and 4

$$\tan\delta'/2=\mu(1+\psi)/[(1-\psi)N\sin\theta]$$

and $$\tan\delta''/2=\mu N(1-\psi)/[(1+\psi)\sin\theta]$$

where $$\mu=\sqrt{(N^2\cos^2\theta-1)}$$

and now, $$\psi=exp\ (-2k\mu d)$$

The phase difference $\delta$ between the two oscillations is given by $\delta=\delta'-\delta''$. Hence $$\tan\delta/2=\frac{\{N^2(1-\psi)^2-(1+\psi)^2\}\mu\sin\theta}{N(N^2-1)(1-\psi^2)\cos^2\theta} \quad (5)$$

As $d\rightarrow 0$, $\psi\rightarrow 1$, and $\tan\delta/2\rightarrow-\infty$. Also $\tan\delta/2=0$ when $N^2(1-\psi)^2=(1+\psi)^2$ and so, as $d$ increases, $\delta$ increases from $-\pi$, passes through zero and finally attains the value corresponding to $d$ being infinite. This final limit is the same as the value of $\delta$ which occurs when the plate is absent.

The reflected wave is circularly polarised when $\tan\delta/2=\pm 1$.

It follows from the preceding paragraph that the possibility $\tan\delta/2=1$ may not always be realised. This will therefore be considered first. Equation 5 becomes a quadratic in $\psi$, which on solving gives $$2kd\mu=\log\left\{\frac{N^2-1+\alpha}{N^2+1\pm\sqrt{(4N^2+\alpha^2)}}\right\} \quad (6)$$

where $$\alpha=N(N^2-1)\cos^2\theta/(\mu\sin\theta) \quad (7)$$

since $d$ must be real and positive it follows from (6) that $$\frac{N^2-1+\alpha}{N^2+1\pm\sqrt{4N^2+\alpha^2}}\geq 1 \quad (8)$$

Now $N>1$, $\alpha\geq 0$ and so 8 can be satisfied only if the denominator is positive. Hence $$N^2+1\pm\sqrt{(4N^2+\alpha^2)}\geq 0 \quad (9)$$

and, from (8), $$\alpha-2\geq\pm\sqrt{(4N^2+\alpha^2)} \quad (10)$$

In (10) the positive sign cannot be taken since, if it were, the right hand side would be greater than the positive quantity $\alpha$ while the left hand side would be less than $\alpha$. Taking the negative sign it is found that (10) is always satisfied and that (9) is satisfied if $\alpha\leq N^2-1$. It follows from (7) that the condition is $$N\cos^2\theta\leq\sin\theta\sqrt{(N^2\cos^2\theta-1)} \quad (11)$$

Now $N\cos^2\theta/\{\sin\theta\sqrt{(N^2\cos^2\theta-1)}\}$ is infinite at $\theta=0$, decreases as $\theta$ increases, passes through a minimum $2N/(N^2-1)$ when $\cos^2\theta=2/(N^2+1)$ and then increases becoming infinite when $\cos\theta=1/N$. Hence if $2N/(N^2-1)>1$, (11) cannot be satisfied and there is no position of the plate for which $\tan\delta/2=1$ and for which this type of circular parisation is possible. Hence if $N<1+\sqrt{2}$ this type of circular polarisation does not occur. Since $d=\infty$ is a possible solution the same remark holds when the plate is absent.

If $N>1+\sqrt{2}$ the reflected wave is circularly polarised for any angle of incidence which satisfies (11) provided that the metal plate is at a distance given by $$d=\frac{1}{2k\sqrt{(N^2\cos^2\theta-1)}}\log\frac{N^2-1+\alpha}{N^2+1-\sqrt{(4N^2+\alpha^2)}} \quad (12)$$

this distance is infinite whenever the equality in (11) holds.

The reflected wave is also circularly polarised when $\tan\delta/2=-1$. The analysis is similar to that for the case $\tan\delta/2=1$. It is found that, when N and $\theta$ have any values but are such that total reflection takes place in the absence of the metal plate, there is always a position of the metal plate for which circular polarisation occurs. The distance of the plate is given by $$d=\frac{1}{2k\sqrt{(N^2\cos^2\theta-1)}}\log\frac{N^2-1-\alpha}{N^2+1-\sqrt{(4N^2+\alpha^2)}} \quad (13)$$

When $N>1+\sqrt{2}$ it is seen that there are two possible positions of the metal plate, given by (12) and (13), which give circular polarisation for angles of incidence satisfying (11).

Figure 2:
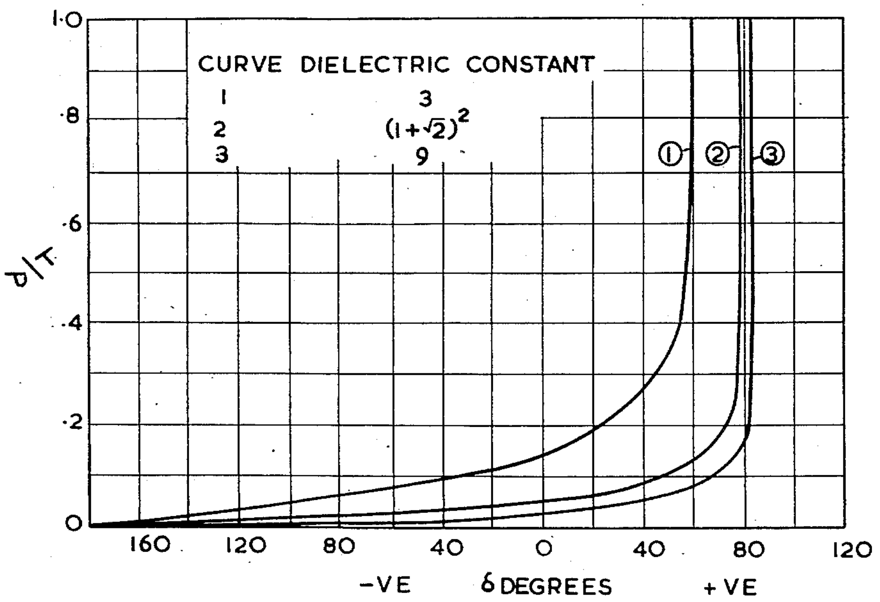
Figs. 2 and 3 are curves showing the phase changes introduced in various conditions of operation.
Figure 3:
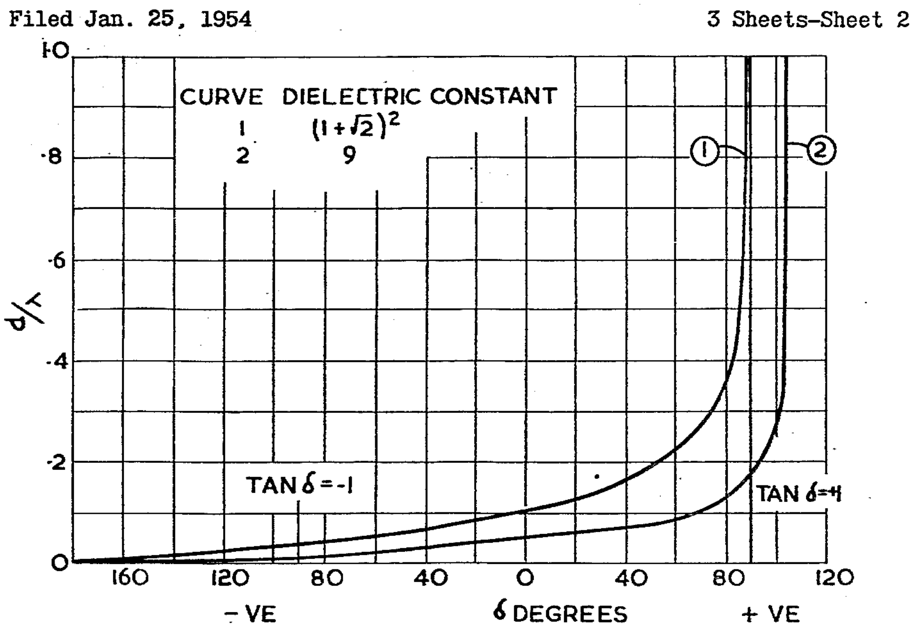

Curves showing the variation of the phase difference $\delta$ with $d/\lambda$ are shown in Figs. 2 and 3 for angles of incidence of 45° and 30° respectively. It is seen from Fig. 2 that a phase difference of +90° cannot be obtained no matter how high the dielectric constant when the angle of incidence is 45°. This is because the inequality (11) is never satisfied.

Fig. 3 shows that two positions of the plate for circular polarisation can be attained with an angle of incidence of 30°, and a dielectric constant of 9. They could also be just obtained with a dielectric constant of $(1+\sqrt{2})^2$ by selecting the angle of incidence. It is to be noted that for these two positions the electric vector rotates in opposite directions.

Figure 4:
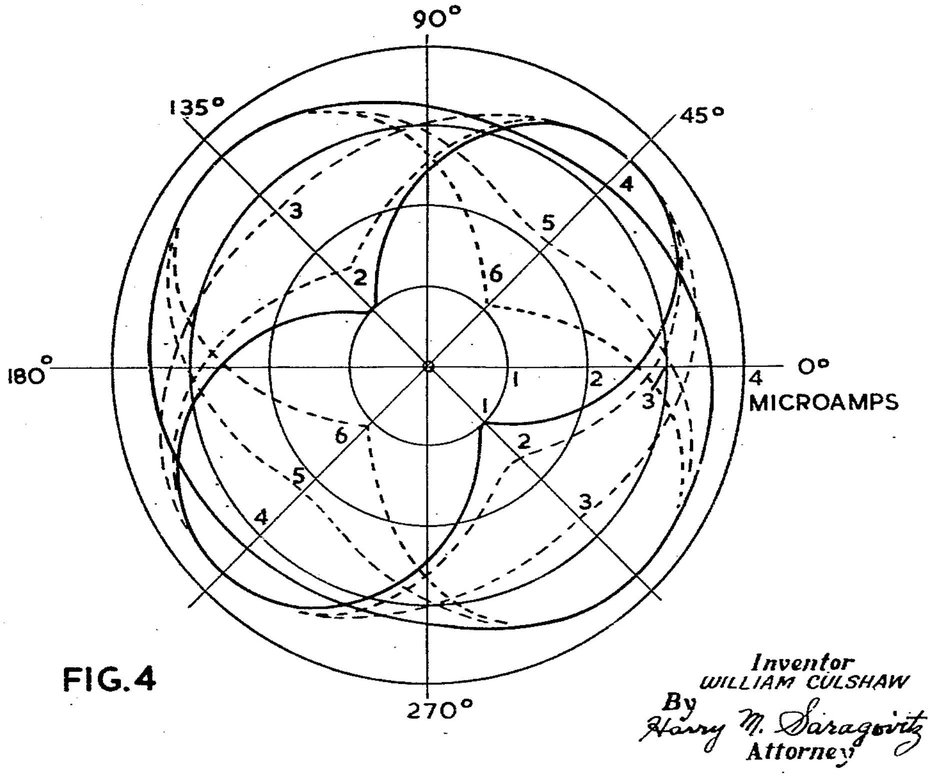
Fig. 4 is a diagram showing various field distributions in a variety of different conditions.

Fig. 4 shows the variation of amplitude with angle of rotation of the receiving horn for different distances $d$ of the plate. Starting with D small the cusp of the curve increases and the response ideally should become circular; this position occurs between curves 3 and 4 of Fig. 4. On passing through this point the whole curves swing round through 90° since $\cos \delta$ changes sign and the axes are interchanged. It is also to be noted that the axes of the incident ellipses are all inclined at approximately 45° to the $x$ axis. The cusp then decreases to zero, where $\delta=0$ and then finally increases to give the same curve at $d=0.971$ cm. as that obtained in the absence of the metal plate.

The curves which are thus obtained by plotting the received amplitude against angle of rotation are not ellipses since their equation is $$A=\sqrt{S}=\sqrt{(m^2 \cos^2 \psi+M^2 \sin^2 \psi)}$$

It can be shown however, that a plot of $1/A$ against angle of rotation of the receiving horn in an ellipse with major and minor axes equal to the reciprocal of the major and minor axes of the incident ellipse.

It follows from the above discussion that by providing a dielectric prism located in the path of a radio wave in such a way that the beam is totally internally reflected in the prism, and by positioning a conductive surface at a suitable distance from it, the plane of polarisation of the incident wave being suitably oriented with respect to the plane of incidence, the emergent wave can be arranged to be circularly polarised or to have a predetermined ellipticity. Alternatively, of course, if the incident wave is polarised in the plane of incidence or normal to the plane of incidence a phase shift can be applied to the wave. By making the position of the conductive surface adjustable with respect to the reflecting surface of the prism the arrangement provides for adjustment of the phase shift applied to the wave, or in the case of circularly or elliptically polarised emergent waves, for adjustment of the degree of ellipticity and for the orientation of the major axis of ellipticity.

Accordingly, in one aspect the invention resides in apparatus for phase change or phase control of electromagnetic radiation comprising, a dielectric mass defining a surface at which total internal reflexion of radiations incoming to and outgoing from the dielectric mass can take place, and a member defining a conductive surface positioned in parallel relation to said totally-reflecting surface whereby change of phase is effected between incident and reflected radiations at the totally-reflecting surface, according to the distance apart of the conductive surface and the totally-reflecting surface.

The invention also provides apparatus for phase-change or phase-control of electromagnetic radiations comprising, a dielectric prism having two transmission faces and a total internally reflecting face, and a member defining a conductive surface positioned in parallel relation to the totally-reflecting surface, whereby change of phase is effected between radiations passing through the transmission faces and reflected at the totally reflecting face, according to the distance apart of the conductive surface and the totally-reflecting face of the prism.

To reduce reflections at junctions along the line of propagation between materials of different dielectric constant quarterwavelength matching sections may be used at such junctions. For instance a quarter wavelength thickness of material of dielectric constant equal to the square root of the dielectric material defining the totally reflecting surface may be used on a surface of the material at 15 across which propagation takes place, in order to reduce reflexions.

The theory discussed above is based on the assumption that the radio beam incident upon and emergent from the transmission faces of the reflecting prism is being propagated in a free space mode. It will be appreciated that radiations emergent from a waveguide cannot be regarded as having a unique axis of propagation by which the angle of incidence may be defined. It follows that for the successful application of the principles described above the channels by which radio waves are conveyed to an apparatus according to either of the above two aspects of the invention for the purpose of modifying the phase characteristics must simulate free space conditions. This may be achieved by operating in large tubes which may be of square cross section so as to be insensitive to the direction of polarisation. Waves from waveguides of normal cross-section may then be launched into such large tubes through the medium of suitable matching devices such as horns, and lenses. For this reason the expedients according to this invention are of particular interest in the field of wavelengths of a few millimeters or less since the manufacture of conventional waveguide devices with the necessary close dimensional tolerances becomes extremely difficult at these very short wavelengths and the need for such devices can be circumvented by using a free-space mode of propagation in a large tube.

With these facts in mind two practical applications of the invention will now be described with reference to Figs. 5 and 6 of the drawings.

Figure 5:
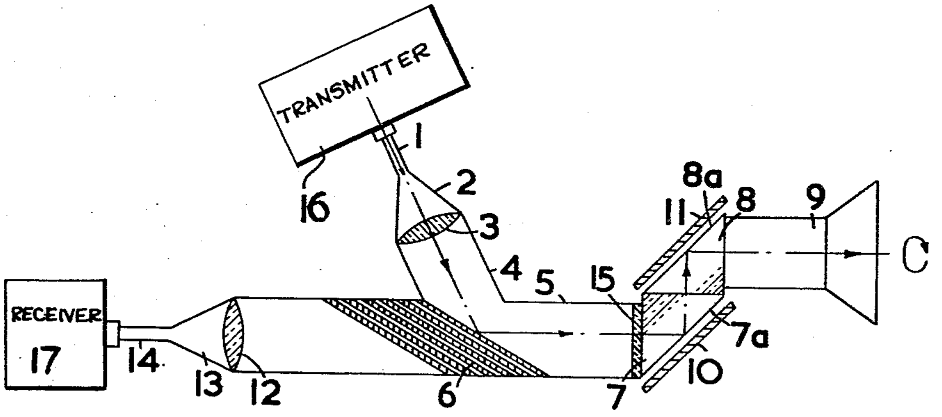
Fig. 5 is a diagrammatic illustration of a form of "common T and R" arrangement.

In Fig. 5 a common T and R system according to the invention is shown diagrammatically. In this arrangement a waveguide 1 is shown, presumed to be connected to a transmitter 16, feeding a horn 2 and a lens 3 which match the waveguide 1 to a tube of large square cross section 4 so as to launch therein radio waves propagated in a free space mode. The tube 4 constitutes a branch of a further large section tube 5 and at the junction of the tubes 4 and 5 there is provided a stack of dielectric sheets 6 which are one quarter wavelength thick and spaced one quarter wavelength apart for the operating frequency. The plates 6 are set at the so-called Brewster angle for waves incident along the axis of either the tube 4 or the tube 5. Assuming that the waves launched down tube 4 are polarised normally to the plane of incidence, the plates 6 constitute an efficient reflector for these waves to redirect them down the tube 5 in the direction towards the right as shown in the drawing.

At the right-hand end of the tube 5 there are shown two prisms 7 and 8 each having a face 7a and 8a at the appropriate angle to reflect the waves by total internal reflection; the emergent face of the prism 8 feeds into a further large cross section tube 9 which may feed into any suitable radiator. Adjacent the faces 7a and 8a of the prisms are metal plates 10, 11, which may be mounted by any convenient means so as to be adjustable towards and away from the corresponding prism face, and these may be adjusted so as to produce a circularly polarised emergent wave in the manner above discussed.

Assuming that the system is part of a radar equipment, for example, it will now be seen that waves received as reflections from a target will, by virtue of their reflection, be polarised circularly with the opposite hand to that of the original transmitted waves and so after passage through the prisms 7 and 8 plane polarised waves will be produced, polarised in this case orthogonally to the transmitter waves and therefore in the plane of incidence upon the plates 6. For these waves therefore the plates 6 will be effectively transparent so that the received waves will pass through the plates 6 to the lens 12, horn 13 and the receiver waveguide 14 to receiver 17.

The use of the two prisms 7 and 8 is convenient because it allows the necessary phase changes to be accomplished in two equal steps; this allows the movement of the metal plates 10 and 11 to take place in regions where adjustment to achieve circular polarisation is not so critical as it would be with one prism (see for example the curves of Fig. 2 where the change of $d/\lambda$ is extremely rapid in the region of $\delta=\pi/2$).

An incidental result of this particular arrangement of prisms is that the direction of propagation in the tube 9 is preserved as the direction parallel to that in the tube 5.

It will be appreciated that, if required, the prisms 7 and 8 may be spaced apart along the direction of propagation between them; the propagation between them will be, of course, under free space conditions and may conveniently be carried out in large cross-section tubes of the same type as tubes 5 and 9 for example.

Obviously other systems than the plates 6 could be used to discriminate between the transmitted and received waves by virtue of their orthogonal polarisation. For example a grid of wires suitably spaced could be used.

Figure 6:
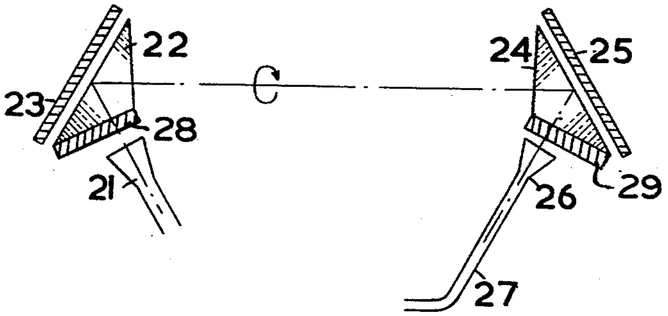
Fig. 6 is a diagrammatic illustration of a rotating waveguide coupling.

The arrangement shown in Fig. 6 could be used to serve as a rotating joint for coupling a transmitter, say, to a waveguide feeding a directional antenna which is required to be swung through an angle. In this arrangement a transmitter horn 21 is shown feeding a prism 22 with which is associated a metal plate 23 in the manner of this invention so as to produce circularly polarised radiations from the emergent face of the prism. Any suitable means may be adopted to provide adjustment of the distance between the metal plate 23 and the prism 22. A second prism and plate system 24, 25, also adjustable as to the distance between them, is positioned to receive the circularly polarised radiations and convert them back into plane polarised form for reception by a horn 26 coupled to the waveguide antenna array 27. Obviously, by virtue of the circularly polarised coupling between the two prisms, the system 24, 25, 26 and 27 can be rotated about the axis of the coupling without disturbing the effective feed to the waveguide 27. It will also be clear that the system may be made sufficiently compact to avoid undue scatter leakage and/or that suitable screening as by the use of large cross section tubes as in Fig. 5 may be employed.

In both the systems of Figs. 5 and 6 it is advantageous to reduce reflections which occur at the junctions of different dielectrics along the line of propagation, for example between the surfaces of the lens 3 or 12 or the non-totally reflecting surfaces of the prisms 7 or 8, and the air. This may be done by using a technique akin to optical blooming which consists in providing a quarter wavelength matching section of dielectric constant $\sqrt{\epsilon}$, where $\epsilon$ is the dielectric constant of the lens or prism material, on the surface to be matched as shown at 28 and 29 in Fig. 6.

Those skilled in the art will see that other applications of the invention may be devised.

I claim:

1. A transmission apparatus comprising a first dielectric prism having two transmission surfaces and a total reflecting surface, a first conductive plate positioned parallel and at a predetermined distance from said reflecting surface to effect phase change, a second dielectric prism having a second conductive plate positioned to effect phase change, said prisms being arranged to produce circularly polarised radiation, a transmitter, a receiver, selective means for reflecting electromagnetic radiation in a given plane polarisation and transmitting radiations polarised at a plane orthogonal to the given plane, said means being positioned to reflect radiations transmitted from said source to said prisms and to transmit orthogonally polarised radiation traveling in the opposite direction to said receiver.

2. A transmission apparatus as claimed in claim 1 wherein said selective means comprises a plurality of dielectric plates each a quarter wave length in thickness and spaced apart a quarter wave length and disposed at the Brewster angle relative to the radiation path between the source and the transmission face of the prisms.

3. A transmission apparatus as claimed in claim 2 wherein a matching section comprising a quarter wave length thickness of a dielectric material of effective dielectric constant equal o the square root of the dielectric constant of the material of the dielectric prism is provided on one transmission face of the prism.

4. A transmit-receive apparatus comprising a pair of dielectric prisms arranged to have adjacent transmission faces in mutual contact, a metallic plate positioned parallel to each reflecting face of each prism and arranged to produce circularly polarised radiation from plane polarised radiation, a transmitter, a receiver, selective means interposed between the transmitter and the receiver for reflecting electromagnetic radiations of a predetermined plane polarisation and passing radiation polarised in a plane orthogonal to the given plane, said means positioned to reflect radiations traveling from said transmitter to said prisms and to pass radiation traveling from said prisms to said receiver.

5. A transmit-receive apparatus as claimed in claim 4 wherein said selective means comprises a plurality of dielectric plates each a quarter wave length in thickness and spaced apart a quarter wave length and disposed at the Brewster angle relative to the radiation path between the source and the transmission face of the prisms.

6. A transmit-receive apparatus as claimed in claim 5 wherein a matching section comprising a quarter wave length thickness of a dielectric material of effective dielectric constant equal to the square root of the dielectric constant of the material of the dielectric prism is provided on one transmission face of the prism.

7. A transmit-receive system comprising a transmitter, a receiver, an antenna, wave polarising means coupled to said antenna, selective means for reflecting electromagnetic wave energy of a predetermined polarisation and for passing wave energy orthogonically polarised, said means arranged between said transmitter and said receiver so that electromagnetic energy traveling from said transmitter to said antenna is reflected onto said polarising means while electromagnetic energy received by said antenna is polarised to pass thru said selective means to said receiver.

8. A transmit-receive apparatus as claimed in claim 7 wherein said selective means comprises a plurality of dielectric plates each a quarter wave length in thickness and spaced apart a quarter wave length and disposed at the Brewster angle relative to the radiation path between the source and the transmission face of the prisms.

9. A transmit-receive apparatus as claimed in claim 8 wherein a matching section comprising a quarter wave length thickness of a dielectric material of effective dielectric constant equal to the square root of the dielectric constant of the material of the dielectric prism is provided on one transmission face of the prism.

10. A transmit-receive system as claimed in claim 4 wherein said polarising means comprises a pair of dielectric prisms arranged to have adjacent transmission faces in mutual contact with metallic plates and spaced at a predetermined distance from the reflecting faces of said prisms.

11. A transmission apparatus of the T–R type comprising a first combination of a dielectric prism having two transmission faces and an internally reflecting face, a conductive surface positioned in parallel relation to the reflecting face whereby change of phase is effected between radiations passing thru the transmission phases and reflected at the reflecting face, a second such combination of the prism and conducting surface disposed relatively to the first to form a radiation path between one transmission face of each prism, the spacing between the conductive surfaces and the reflecting faces of each prism being adjusted so that plane polarised radiation applied to the prisms produces circularly polarised radiation output, a source of electromagnetic radiations, receiving means for electromagnetic radiations, antenna means for electromagnetic radiations coupled to said prisms, means for selectively reflecting electromagnetic radiations in a given plane polarisation and transmitting radiations polarised in a plane orthogonal to the given plane, said means being positioned to reflect radiations from the source to said prisms and to transmit radiations traveling from the antenna means and passing through said prisms.

(References on following page)

References Cited in the file of this patent

UNITED STATES PATENTS

| | | |
|---|---|---|
| 2,129,712 | Southworth | Sept. 13, 1938 |
| 2,409,407 | Turner | Oct. 15, 1946 |
| 2,627,027 | Knock | Jan. 27, 1953 |

FOREIGN PATENTS

| | | |
|---|---|---|
| 976,767 | France | Nov. 1, 1950 |

OTHER REFERENCES

Bronwell: "Transmission-Line Analogies of Plane Electromagnetic-Wave Reflections," Proc. of the I. R. E., April 1944.